(12) United States Patent
Luis

(10) Patent No.: US 7,108,023 B2
(45) Date of Patent: Sep. 19, 2006

(54) WINE PRESERVATION SYSTEM USING A CENTRAL VACUUM

(76) Inventor: Armando Luis, 126 Washington St., Hoboken, NJ (US) 07030

( * ) Notice: Subject to any disclaimer, the term of this patent is extended or adjusted under 35 U.S.C. 154(b) by 0 days.

(21) Appl. No.: 11/086,877

(22) Filed: Mar. 22, 2005

(65) Prior Publication Data

US 2005/0161108 A1    Jul. 28, 2005

Related U.S. Application Data

(63) Continuation of application No. 10/645,149, filed on Aug. 21, 2003, now Pat. No. 6,886,605.

(51) Int. Cl.
*B65B 31/00* (2006.01)

(52) U.S. Cl. .................... 141/65; 141/4; 141/8; 141/52; 141/57; 99/472

(58) Field of Classification Search .................. 141/44, 141/47, 52, 57, 63–65, 83, 94, 95, 325, 326; 99/472, 646 C; 220/212–214, 231, 912
See application file for complete search history.

(56) References Cited

U.S. PATENT DOCUMENTS

| | | |
|---|---|---|
| 2,303,766 A | 12/1942 | Scherbak |
| 2,729,381 A | 1/1956 | Wiser |
| 4,475,576 A | 10/1984 | Simon |
| 4,512,251 A | 4/1985 | Green |
| 4,905,454 A | 3/1990 | Sanfilippo et al. |
| 5,215,129 A | 6/1993 | Berresford et al. |
| 5,299,408 A | 4/1994 | Dupont |
| 5,339,959 A | 8/1994 | Cornwell |
| 5,746,259 A | 5/1998 | Noble, III |
| 5,778,763 A | 7/1998 | Ford, Sr. |
| 6,626,092 B1 | 9/2003 | Tarlow |

OTHER PUBLICATIONS

Wine Preservation, Strictly Cellars & Accessories, available at http://www.strictlycellars.com/wine-preservation/wine-preservation.htm.
Le Verre de Vin, *Wine Preservation Without Reservation*, available at http://www.strictlycellars.com/wine-preservation/LVDV-spec-sht.pdf.
Opportunity By the Glass, Kelly Gray, Bar & Beverage Magazine, Jul./Aug. 2001, available at http://www.strictlycellars.com/news/news.htm—Opportunity%20By%20The%20Glass.
Vacuum Wine Saver, available at http://www.vacuvin.nl/con-ws.htm.
What is the shelf-life of an opened bottle of red? available at http://www.virtual-ink.com.au/afw-faq/faq011.htm.

*Primary Examiner*—Timothy L. Maust
(74) *Attorney, Agent, or Firm*—Hogan&Hartson L.L.P.

(57) ABSTRACT

An apparatus for the preservation of still beverages is disclosed. The apparatus includes a vacuum tank capable of maintaining a standing vacuum. The apparatus also includes a vacuum pump connected to the vacuum tank. The vacuum pump reduces the pressure in the vacuum tank to create the vacuum. A vacuum line is connected to the vacuum tank, and at least one valve head is connected to the vacuum line for receiving a bottle having a stopper placed therein. The valve head exposes the bottle and stopper to a vacuum. Upon exposure to the vacuum, air in the bottle is substantially evacuated and is prevented from reentering the bottle by the stopper.

13 Claims, 5 Drawing Sheets

WINE PRESERVATION SYSTEM USING A CENTRAL VACUUM

CROSS-REFERENCE TO RELATED APPLICATIONS

The present application is a continuation of U.S. application Ser. No. 10/645,149, filed Aug. 21, 2003 now U.S. Pat. No. 6,886,605.

BACKGROUND OF THE INVENTION

1. Field of the Invention

The present invention is directed to an apparatus for preserving still beverages. More particularly the present invention is directed to an apparatus for the preservation of wine through the removal of air from a previously opened bottle.

2. Description of the Prior Art

It is well known that wine spoils quickly when oxidized through exposure to air. In short, wine+air=vinegar. On the producer/supplier side, much time and money is spent in the quest for the ideal closure, one that seals and protects bottled wine from spoilage, while still allowing wine to benefit from bottle aging. Closures range from traditional cork, to synthetic materials, to screw caps. But on the retail/consumer side, the options for preserving wine, once opened, are few. If a bottle is not finished, it can be adequately maintained at room temperature for several hours—and usually no more than a day or two at most—before developing noticeable off flavors. Refrigeration may in some instances extend the useful life of an opened bottle, but again by now more than several days. The downside to refrigeration is that, when served below their optimal temperature, over-chilled wines often taste dead and lifeless.

One known method for the preservation of wine in a bottle is to evacuate the air space above the liquid once some of the wine has been consumed and then seal the bottle with a stopper. One system for accomplishing this is the Vac-U-Vin™ system. The Vac-U-Vin™ system requires a special stopper to be placed in the bottle neck. This stopper has a slit that acts as a non-return valve. The valve opens if a vacuum is created above the stopper to allow air to be sucked out of the bottle but closes again as soon as the external pressure is greater than the pressure inside the bottle. To create a vacuum above the stopper, a manual suction pump is used. This operates satisfactorily, but pump operation is time-consuming and strenuous if an adequate level of vacuum is to be produced in the bottle. It has been observed that the maximum vacuum that can be achieved using the Vac-U-Vin™ pump is approximately 17 in-Hg. There is also no convenient or accurate method of determining when a suitable vacuum level has been achieved.

U.S. Pat. No. 4,684,033 describes another known method of preserving wine in an opened wine bottle by inflating a bladder inside the bottle to fill the space above the liquid and to prevent oxygen from reaching the wine. To do this is a time-consuming operation, which requires considerable manual dexterity in introducing a deflated bladder into the bottle and then inflating it. This method also requires that the bladder be removed, washed, and cleaned after each use.

Another option for preserving an opened bottle of wine involves pouring the contents of the opened bottled into a smaller bottle, decanter or the like having less airspace above the wine, inserting an airtight stopper and then storing. Finally, the air in an opened bottle may be replaced with a layer of inert gas, such as nitrogen, and stored. In one such system as described in U.S. Pat. No. 4,475,576, a stopper is inserted into a bottle to replace the cork and remain with the bottle for the lifetime of the wine. The stopper is provided with passageways and valves to permit the bottle to be pressed against a contact-operated dispenser head, directing a blast of inert gas such as Argon into the bottle to expel at first air, and subsequently a mixture of air and Argon or other inert gas, until the percentage of oxygen is so low as not to represent a threat to the wine.

On the commercial consumption side, however, none of these solutions are adequate. For instance, in restaurants, wine bars and the like where wine is served by the glass, the problem of wine preservation is greatly magnified by the sheer number of bottles. Spoilage accounts for waste and lost profits when opened bottles of wine are not consumed before their useful shelf life. This often limits the selection of wines offered by the glass to those that are either (a) relatively inexpensive or (b) so popular that they are virtually guaranteed to be consumed shortly after opening (e.g. Chardonnay, Merlot, etc.). There is little incentive for expensive wines, older vintages, or lesser-known varietals to be offered where the chance of unfinished bottles and spoilage is great. It is impractical, particularly in a busy restaurant or bar, for servers to use any of the previously mentioned methods to preserve opened bottles of wine. Evacuating air from a bottle using a hand pump such as the Vac-U-Vin™ is time-consuming and inconsistent. A bartender is unlikely to take the time required to properly vacuum seal a bottle of wine by hand when there are customers waiting to be served. And if the pumping and sealing is delayed, the damage to the wine from exposure to air is already done.

Decanting and storing opened wine in smaller vessels is even more unrealistic in the commercial setting. And while inert gas systems find use in some retail serving establishments, such systems can be quite expensive due not in the least part to the continued consumption of the inert gas. Inert gas systems are also impractical due to their bulk and the space required to install and maintain such a system, in which each bottle of wine requires its own stopper and tap for dispensing the stored wine.

Mechanical pump systems located at the bar are expensive, slow, and noisy. One mechanical system is described in U.S. Pat. No. 5,215,129 and has been commercialized as "Le Verre de Vin" (the glass of wine) system. The system comprises a self-contained wall-mounted unit, which receives a wine bottle. Pressing the wine bottle into a housing and closing electrical contacts housed therein starts a pump. Once the contacts are closed, the pump begins to draw air in the bottle through a stopper having a one-way valve.

While the Verre de Vin system can be used to evacuate air from a bottle of wine, it has some inherent operational—as well as commercial—drawbacks. Initially, because the system is designed without a vacuum tank, the pump must cycle on and off with each depression of the housing. This creates at least three interrelated problems. Initially, the pump is noisy and can be annoying to patrons of the establishment in which such a device is installed. Secondly, the pump can only be started and stopped a predetermined number of times over a set period. Any more frequent actuation can result in the failure of the motor. According to the specifications, the Verre de Vin system can evacuate no more than fifteen bottles over a five-minute period. In a busy bar setting, this number can easily be surpassed, resulting in partially consumed bottles being left un-evacuated. Third, because there is no storage tank to maintain a vacuum in the system, there is a delay between the actuation of the pump and the drawing of a vacuum on the bottle. This is a result of the pump having to also evacuate air from the line between the pump and the bottle. It has been observed that in order to achieve a vacuum of 22 in-Hg in a half-empty, standard 750 ml wine bottle using the Verre de Vin system requires 12 seconds. In a busy setting in which customers are waiting to be served, a bartender is unlikely to take this time to evacuate a bottle of wine between each pour, leading to partially-consumed bottles of wine being left exposed to air. Finally, due to the size and single-user nature of the Verre de Vin system, the owner of a bar or other establishment is forced to sacrifice precious bar space for mounting or housing the device in a central location accessible throughout the service area. These and other problems make the Verre de Vin system a less than ideal solution.

Accordingly, there is a need for a simple, fast, low-cost system, capable of supporting multiple users, that can be easily implemented by restaurants and bars to enable such establishments to open a greater variety of wines for their "by the glass" consumers without fear of spoilage or suffering economic loss.

SUMMARY OF THE INVENTION

One embodiment of the present invention is directed to an apparatus for the preservation of still beverages. The apparatus includes a vacuum tank capable of maintaining a standing vacuum. The apparatus also includes a vacuum pump connected to the vacuum tank. The vacuum pump reduces the pressure in the vacuum tank to create the vacuum. The apparatus further includes a vacuum line fluidly connected to the vacuum tank. At least one valve head is connected to the vacuum line and interfaces with a bottle having a stopper placed therein. The valve head also includes an actuator, whereupon actuation, air in the bottle is evacuated by exposure to the vacuum and is prevented from reentering the bottle by the stopper.

A further embodiment of the present invention is directed to a method of preserving still beverages. The method includes inserting a stopper having a one-way valve into a bottle and inserting the stoppered bottle into the valve head of an apparatus to substantially evacuate air from the bottle. The apparatus has a vacuum tank for maintaining a standing vacuum, a vacuum pump connected to the vacuum tank for reducing pressure in the tank to create the vacuum, a vacuum line connected to the vacuum tank, and a valve head connected to the vacuum line. Actuating the valve head permits the application of the vacuum in the vacuum line to the bottle to substantially evacuate air contained therein.

Another embodiment of the present invention is directed to a valve head having a handle for gripping the valve head and for transmission of a vacuum from a vacuum line to the valve head. The valve head also includes an interface for receiving a bottle and a valve body for connection of the handle and the interface. Further, the valve head includes a valve stem having first and second positions and having a valve seat for fluid isolation of the interface from the handle when the valve stem is in a first position. The valve head also includes an actuator for transmission of energy to the valve stem to move the valve stem from a first position to a second position, wherein upon movement of the valve stem from the first to the second position, the interface and the handle are in fluid communication.

The various features of novelty that characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

DETAILED DESCRIPTION OF CERTAIN PREFERRED EMBODIMENTS OF THE INVENTION

Figure 1:
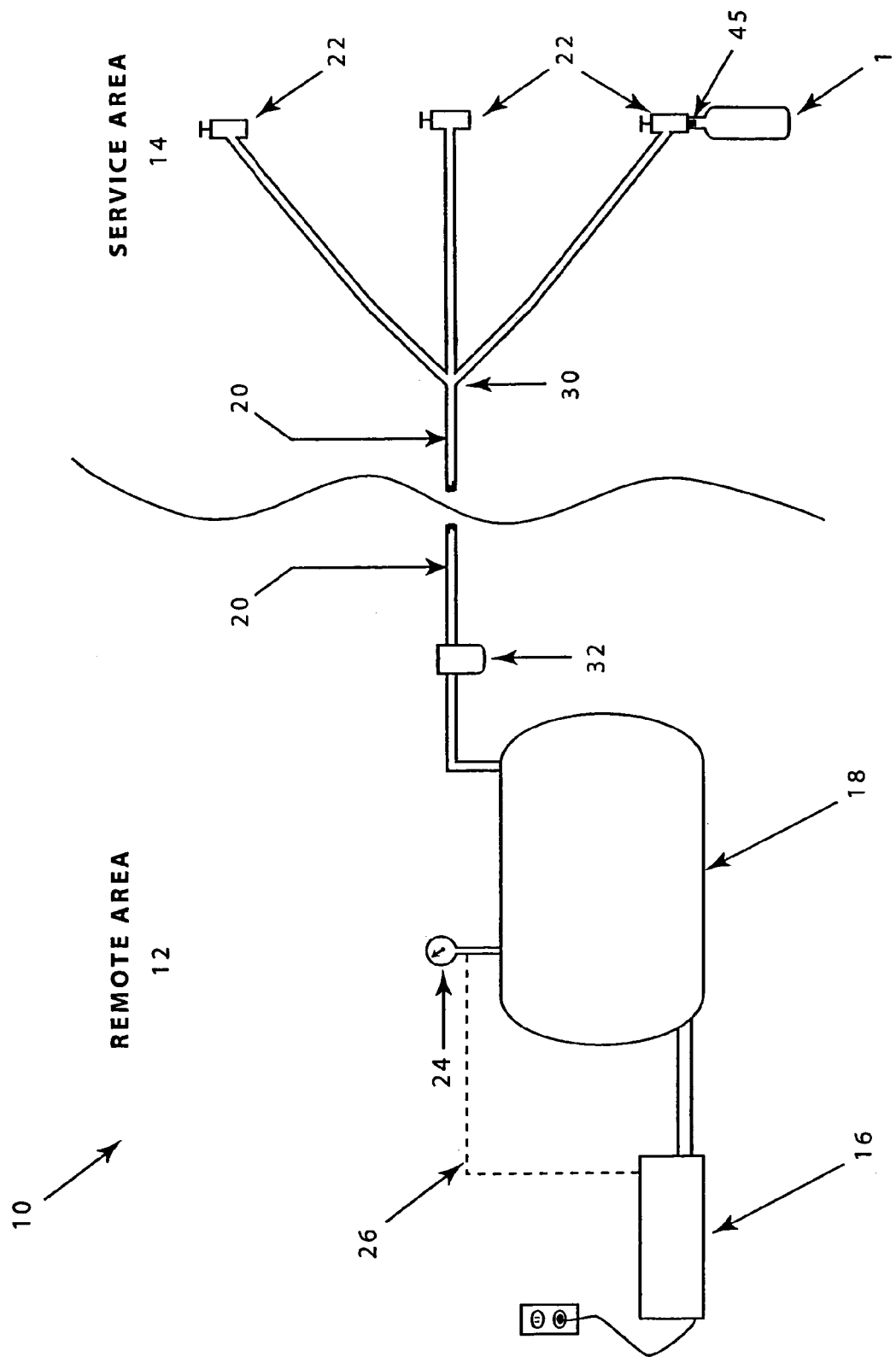
FIG. 1 is a schematic diagram of one embodiment of the present invention.

FIG. 1 depicts a wine preservation system 10 according to one embodiment of the present invention. The wine preservative system 10 may be divided between a remote/central area 12 and a service area 14. The remote/central area 12 includes a vacuum pump 16 which may be electrically powered. The pump 16 takes suction on the vacuum tank 18 drawing any air from the vacuum tank 18 until a desired standing vacuum level is achieved. The vacuum level is preferably registered by a vacuum gauge 24. The vacuum gauge 24 and/or the vacuum tank 18 is/are connected to the pump 16 via a pump feedback mechanism 26.

The feedback mechanism 26 stops the pump upon reaching the desired vacuum level in the vacuum tank 18. The feedback mechanism may be an adjustable electrical, pneumatic, hydraulic, or the like type of feedback element for starting and stopping the pump according to the vacuum level in the vacuum tank 18. It has been determined that at vacuum levels above 25 in-Hg, gases entrained in the wine tend to be released, causing bubbling of normally still wine. This effect is generally not desirable and may in fact have deleterious effects on wine. Accordingly it is preferable that the vacuum level in the system 10 does not exceed 25 in-Hg. In a preferred embodiment, a standing vacuum is maintained between about 17–25 in-Hg, most preferably between about 22–24 in-Hg. It has been observed that a bottle of wine vacuum-sealed to 22–24 in-Hg can last up to two weeks without any noticeable degradation due to oxidation.

The vacuum tank 18 is connected to a vacuum line 20 that traverses the remote/central and service areas. The vacuum line 20 may be divided by a manifold 30 to service a plurality of valve heads 22 in one or more service areas 14. In FIG. 1, the manifold 30 is shown in a service area 14, however, its location may be in either a service area 14 or the remote/central area 12 as desired by the user. The remote/central area may be in the basement of an establishment, storeroom, or some other suitable location that is remote from where patrons are likely to congregate. Remote locations of this sort are commonly used in restaurants and bars for beer kegs. The kegs are stored remotely and connected by hoses to taps at the bar for dispensing of the beer contained therein. Similarly, the tank 18 and the pump 16 components of the present wine preservation system may advantageously be located remotely.

In order to prevent wine, contaminants, etc. from entering the vacuum tank 18, a trap or filter 32 may be placed anywhere in-line between the tank and valve heads. Further, additional vacuum lines 30 and valve heads 22 may be added by direct connection to the tank, manifold, or vacuum line. As more lines are added, the overall efficiency of the system is increased due to the increase in volume. And the addition of valve heads 22 makes the wine preservation system of the present invention a multi-user system. One remote/central vacuum tank 18 and pump 16 can support multiple valve heads 22 located at multiple service areas 14. Because of the minimal space requirements of valve head 22 and its vacuum line 30 relative to the pump 16 and vacuum tank 18, the present system does not take up valuable space in a service area 14.

In operation, when power is provided to the pump 16, it begins to evacuate air from the vacuum tank 18 and the connected vacuum lines 20 until a desired vacuum level is reached. Because of the size of the vacuum tank 18 and the length of the vacuum lines 20, it may initially take a few minutes to achieve the desired vacuum level in the system 10. With the valve heads 22 closed to insure that no air leaks into the system, the pressure in the tank 18 is drawn down to a desired cut-off point.

Figure 2:
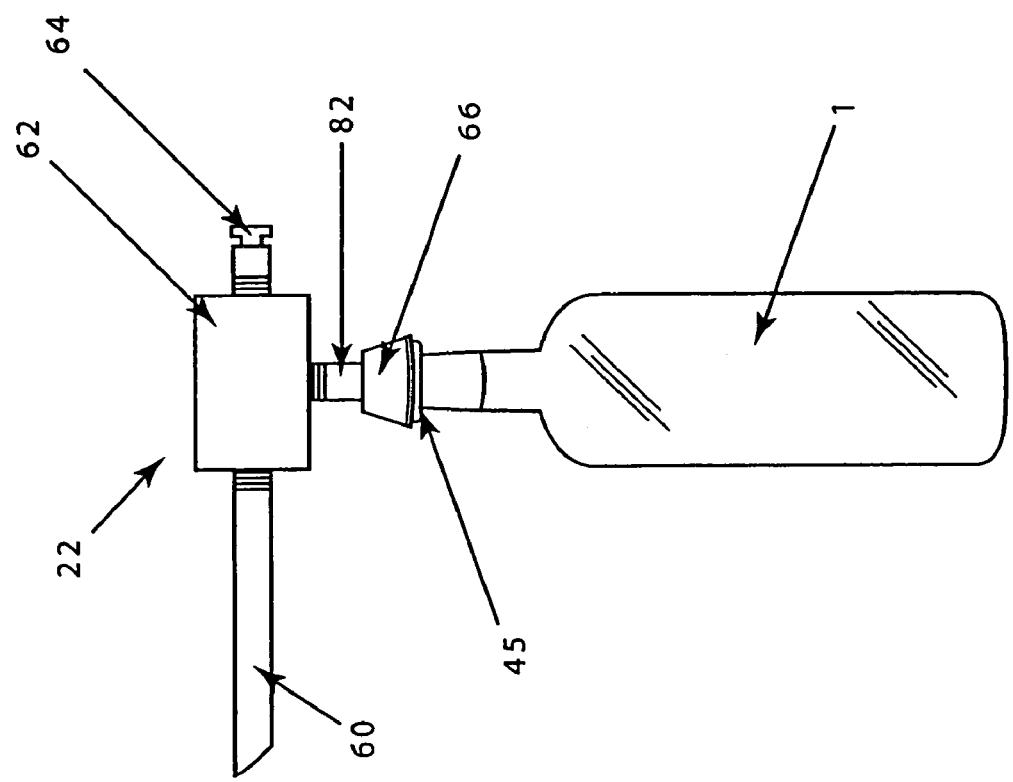
FIG. 2 is a profile view of a valve head attached to a bottle of wine according to one aspect of the present invention.

A valve head 22 according to one embodiment of the present invention is shown in FIG. 2 comprised of a handle 60, a valve body 62, an actuator 64, and a bottle interface 66. In one embodiment of the present invention, the handle 60 serves two functions. Initially, the handle 60 provides a convenient means for the user to grasp the valve head 22; secondly, it transmits the vacuum from the vacuum line 20 to the valve body 62. The bottle interface 66 seals releasably with a stopper 45, which may be inserted into a wine bottle or other vessel as shown in FIG. 2.

Figure 3:
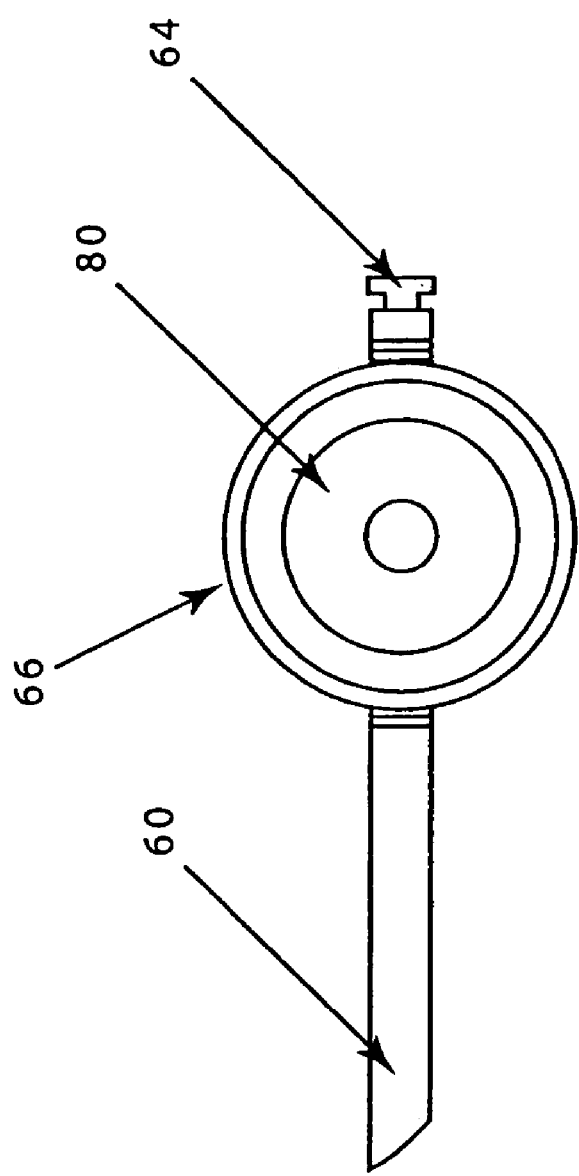
FIG. 3 is a bottom view of a valve head according to another aspect of the present invention.
Figure 4:
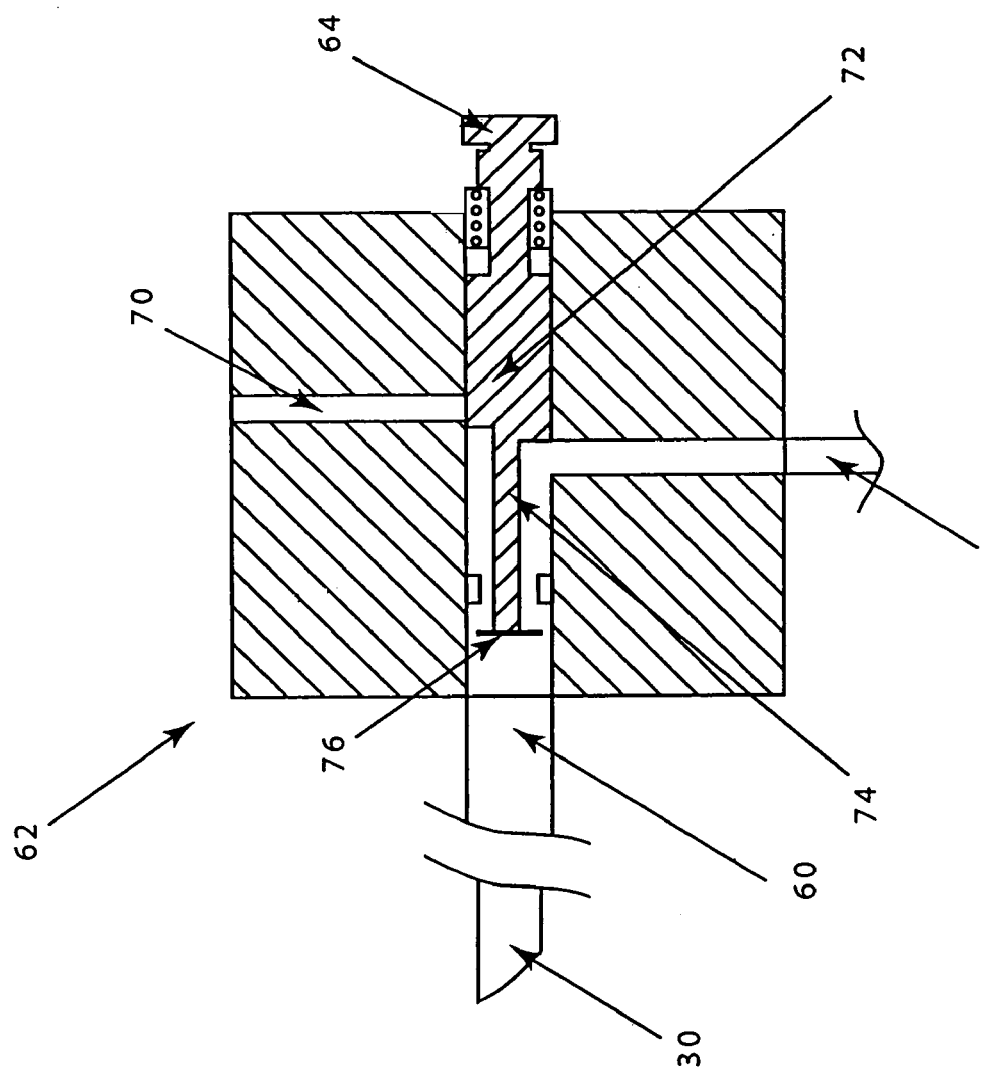
FIG. 4 is a cross-section view of a valve body including a valve stem according to another aspect of the present invention.

In one embodiment of the present invention, the bottle interface 66 is formed having a substantially frustum shape (truncated cone). The base, or larger diameter section, has a recess 80 for accepting a wine bottle as shown in FIG. 3. The smaller diameter truncated portion of the cone shape may be directly connected to the valve body 62, or connected to the valve body 62 via a tube 82 as shown in FIGS. 2 and 4. The recess 80 of the bottle interface 66 receives a one-way stopper 45 and forms a substantially airtight seal between the stopper 45 and the bottle interface 66.

The valve body 62 includes a valve stem 72 shown in FIG. 4. The valve stem 72 is preferably spring-biased to the normally closed position. This ensures that upon release of the actuator 64 by the user, the valve stem 72 and an associated valve seat 76 will return to a closed position, thereby maintaining the system vacuum. Other valves may also be used without departing from the scope of the present invention.

In one embodiment of the present invention, the valve body 62 has a vacuum relief port 70. The vacuum relief port 70 allows for equalization in pressure between the atmosphere and an area above the stopper 45 in the bottle interface 66. Without such equalization of pressure, it may be difficult to remove the bottle interface 66 from the stopper 45 and the bottle 1, following the application of a vacuum to the valve head 22, as the bottle 1 and stopper 45 may be suctioned to the valve head 22.

In a further embodiment of the present invention, the valve body 62 includes a valve stem 72 having a reduced diameter portion 74 and a valve seat 76. In operation, when the valve stem 72 is in a first closed position, the reduced diameter portion 74 permits airflow between the vacuum relief port 70 through the valve body 62 and into the bottle interface 66. This enables the equalization of pressure between the atmosphere and an area above the stopper 45 when placed in the bottle interface 66. At the same time, the valve seat 76 prevents flow between the system vacuum and the atmosphere or the remainder of the valve body. When the valve stem 72 is moved into a second open position, the vacuum relief port 70 is covered by a portion of the valve stem 72 and sealed to prevent airflow between relief port 70 and the bottle interface 66. At the same time, the valve seat 76 connected to the valve stem 72 is displaced axially. Upon the movement of the valve seat 76 along its axis, the reduced diameter portion 74 is projected through an opening created by the movement of the valve seat 76. It is preferable that the valve seat 76 has a larger diameter than the reduced diameter portion 74 of the valve stem 72. This difference in diameter provides a flow path for the air to be evacuated from the bottle 1. Because the bottle interface 66 and the stopper 45 are exposed to and in fluid communication with the vacuum of the system 10, air in the bottle 1 is drawn through the stopper 45, through the bottle interface 66, through the valve body 62 and into the vacuum line 30. Because the vacuum relief port 70 is covered during vacuum operation there is no communication between the vacuum of the system and the atmosphere.

Figure 5:
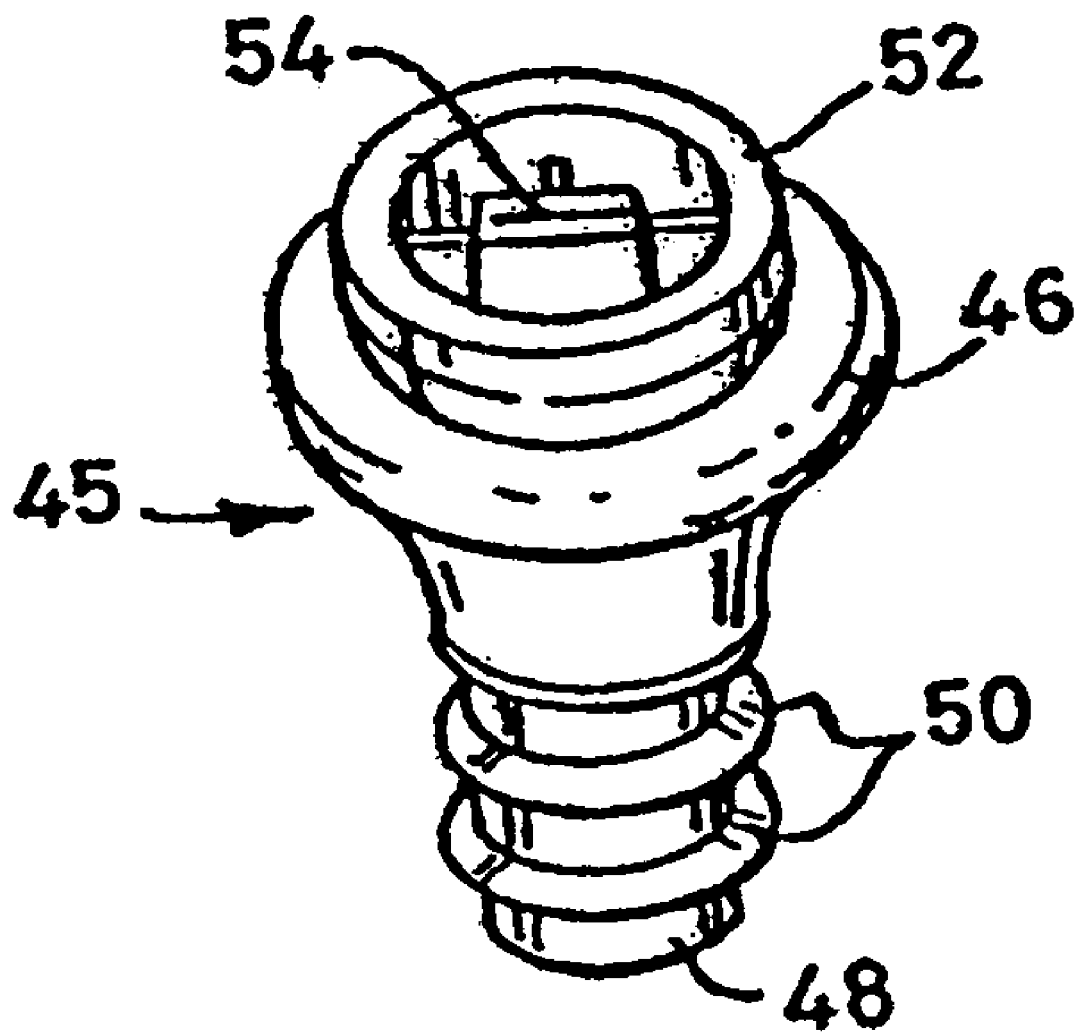
FIG. 5 is a perspective view of a stopper according to another aspect of the invention.

The valve head 22 is adapted to interface with a one-way bottle stopper, such as that commercially available and used in the Vac-U-Vin™ system. FIG. 5 depicts one such stopper 45. As explained above, the stopper 45 seals releasably with the bottle interface 66 of the valve head 22. The stopper 45 is comprised of a reed valve 54, a vacuum seal 52, a flange 46, a neck portion 48 and bottle seal rings 50. The reed valve 54 prevents the flow of air from the atmosphere from entering the bottle. The differential in pressure between the atmosphere and the interior of the bottle, when under a vacuum, force the reeds of the reed valve 54 to compress against each other and form a seal. Upon application of a vacuum to the bottle interface 66 of the valve head 22, and thereby to the stopper 45, air will be drawn out of the bottle 1 through the reed valve 54. The flange 46 ensures that the stopper 45 is not forced into the bottle or drawn into the bottle by the vacuum created therein. The neck portion 48 of the stopper 45 is inserted into the bottle and stabilizes the connection of the stopper 45 in the bottle as well as forms a seal around the opening in the bottle. Finally, the bottle seal rings 50 assist in ensuring that there is an airtight seal between the bottle and the stopper 45.

By placing the recess 80 of the bottle interface 66 over a wine bottle with a stopper 45 already inserted, a releasable seal is formed between the bottle interface 66 of the valve head 22 and the vacuum seal 52 of the stopper 45. Subsequent actuation of the actuator 64 subjects the area of the bottle interface 66 above the stopper 45 to a vacuum. The creation of the vacuum above the reed valves 54 creates a pressure differential between the vacuum in the bottle interface 66 and the pressure in the bottle 1. This pressure differential causes air in the bottle 1 to flow out through the reed valves until the pressure in the bottle 1 equalizes with the vacuum level in the system. Because of the large differential in relative volumes between the bottle 1 and the system 10, the contents of the bottle can be rapidly placed under a vacuum to preserve its contents.

It has been observed that a system as described above having a 95 liter vacuum tank can impart a vacuum of 22 in-Hg and thereby substantially evacuate the air in a standard 750 ml bottle of wine that is three-quarters full (i.e., following the dispensing of approximately one glass) in approximately 1.5 seconds. In a 750 ml bottle that is approximately one-half full, the air can be substantially evacuated in approximately 2.5 seconds, and in a bottle that is one-quarter full (i.e., having approximately one glass of wine remaining), the air can be substantially evacuated in approximately 3.5 seconds. Because of the speed and ease of use of the present system, it is far more likely to be used in a busy setting than other wine preservation systems and methods.

As air is drawn from a series of bottles, the pressure in the system will begin to rise and the vacuum level in the vacuum tank 18 will begin to decrease. This pressure increase is sensed by the pump feedback mechanism 26 and upon reaching a predetermined minimum value of standing vacuum, the pump 16 is switched on and again draws down the vacuum in the vacuum tank 18 to a desired level. As described above, a preferred range for the standing vacuum is between about 17–25 in-Hg, most preferably between about 22–24 in-Hg.

The wine preservation system of the present invention overcomes the problems associated with the prior art though the use of a single, centrally located vacuum system supporting one or more valve heads for use in the wine serving area(s). According to one embodiment, the present invention allows for multiple users at the same time. Rapid, consistent vacuum pressure is applied to every bottle, every time. The system provides essentially noise-free operation at the valve head and is quieter and simpler to use than commercially available mechanical pump systems located at the bar/service area. Further, the system is cheaper to operate, faster and less intrusive than such mechanical pump systems or preservation systems using inert gases.

Thus the present invention, its objects and advantages are realized, and although certain preferred embodiments have been disclosed and described in detail herein, its scope and objects should not be limited thereby; rather its scope should be determined by that of the appended claims.

What is claimed is:

1. An apparatus for the preservation of still beverages comprising:
    a vacuum tank for maintaining a standing vacuum;
    a vacuum pump fluidly connected to said vacuum tank for reducing a pressure in said tank to create the vacuum;
    a vacuum line fluidly connected to said vacuum tank;
    at least one valve head fluidly connected to said vacuum line for interfacing with a bottle having a stopper placed therein;
    an actuator, wherein upon actuation air in the bottle is substantially evacuated by exposure to the vacuum and is prevented from reentering the bottle by the stopper; and
    a vacuum release, wherein following evacuation of the bottle the pressure between said valve head and the stopper is equalized with atmospheric pressure.

2. The apparatus of claim 1, wherein said actuator displaces a valve seat located in said valve head to expose the stopper to the vacuum upon displacement of said valve seat.

3. The apparatus of claim 1, further comprising a trap in said vacuum line to prevent liquid or contaminants from entering said vacuum tank.

4. The apparatus of claim 1, further comprising a feedback mechanism, wherein said feedback mechanism starts said vacuum pump when the vacuum in said vacuum tank is below a first pre-determined level and stops said vacuum pump when the vacuum in said vacuum tank reaches a second predetermined level.

5. The apparatus of claim 1, further comprising a gauge to determine the level of the vacuum in said vacuum tank.

6. The apparatus of claim 1, further comprising a manifold for attachment of a plurality of vacuum lines.

7. The apparatus of claim 1, wherein the valve head further comprises:
    a valve body housing a valve stem for controlling the communication of vacuum from said vacuum line to the bottle.

8. The apparatus of claim 7 further comprising a valve seat, wherein said valve seat is disposed on said valve stem and is displaced axially upon the actuation of said actuator.

9. The apparatus of claim 8, wherein said valve stem further comprises a reduced diameter portion having a smaller diameter than the diameter of said valve seat, said reduced diameter portion being advanced through an opening created by the axial displacement of said valve seat upon actuation, and wherein the advancement of said reduced diameter portion in the opening permits fluid communication between said valve body and said vacuum line.

10. The apparatus of claim 1, wherein said vacuum tank maintains a standing vacuum between about 17 in-Hg and about 25 in-Hg.

11. The apparatus of claim 10, wherein said vacuum tank maintains a standing vacuum between about 23 in-Hg and about 24 in-Hg.

12. The apparatus of claim 1, wherein air remaining in a partially consumed 750 ml bottle is substantially evacuated in no more than about 3.5 seconds.

13. The apparatus of claim 1, wherein said vacuum release is a vacuum relief port.

* * * * *

UNITED STATES PATENT AND TRADEMARK OFFICE
CERTIFICATE OF CORRECTION

| | |
|---|---|
| PATENT NO. | : 7,108,023 B2 |
| APPLICATION NO. | : 11/086877 |
| DATED | : September 19, 2006 |
| INVENTOR(S) | : Armando Luis |

It is certified that error appears in the above-identified patent and that said Letters Patent is hereby corrected as shown below:

In claim 11 at column 8, line 40: "between about 23 in-Hg" should read --between about 22 in-Hg--.

Signed and Sealed this

Fifth Day of December, 2006

JON W. DUDAS
*Director of the United States Patent and Trademark Office*